United States Patent
Okazaki

(10) Patent No.: US 9,708,958 B2
(45) Date of Patent: Jul. 18, 2017

(54) CORDIERITE-TYPE CERAMIC HONEYCOMB STRUCTURE AND ITS PRODUCTION METHOD

(71) Applicant: HITACHI METALS, LTD., Tokyo (JP)

(72) Inventor: Shunji Okazaki, Miyako-gun (JP)

(73) Assignee: HITACHI METALS, LTD., Tokyo (JP)

(*) Notice: Subject to any disclaimer, the term of this patent is extended or adjusted under 35 U.S.C. 154(b) by 0 days.

(21) Appl. No.: 14/896,808

(22) PCT Filed: Sep. 24, 2014

(86) PCT No.: PCT/JP2014/075273
§ 371 (c)(1),
(2) Date: Dec. 8, 2015

(87) PCT Pub. No.: WO2015/046242
PCT Pub. Date: Apr. 2, 2015

(65) Prior Publication Data
US 2016/0250577 A1    Sep. 1, 2016

(30) Foreign Application Priority Data
Sep. 24, 2013  (JP) ................................. 2013-197083

(51) Int. Cl.
*B01D 46/24* (2006.01)
*C04B 35/195* (2006.01)
(Continued)

(52) U.S. Cl.
CPC ....... *F01N 3/2828* (2013.01); *B01D 46/2429* (2013.01); *B01D 53/9418* (2013.01);
(Continued)

(58) Field of Classification Search
CPC combination set(s) only.
See application file for complete search history.

(56) References Cited

U.S. PATENT DOCUMENTS 5,141,686 A    8/1992  Murtagh
7,618,699 B2  11/2009  Beall et al.
(Continued)

FOREIGN PATENT DOCUMENTS

JP    2005-052750 A    3/2005
JP    2007-525612 A    9/2007
(Continued)

OTHER PUBLICATIONS

International Search Report of PCT/JP2014/075273 dated Dec. 16, 2014 [PCT/ISA/210].

*Primary Examiner* — David Sample
*Assistant Examiner* — Nicholas W Jordan
(74) *Attorney, Agent, or Firm* — Sughrue Mion, PLLC

(57) ABSTRACT

A cordierite-type ceramic honeycomb structure having large numbers of flow paths partitioned by porous cell walls; the cell walls having (a) porosity of more than 65% and 75% or less, (b) in a pore diameter distribution measured by mercury porosimetry, (i) a pore diameter d10 at a cumulative pore volume corresponding to 10% of the total pore volume being less than 50 μm, a pore diameter (median pore diameter) d50 at 50% being 18-27 μm, a pore diameter d90 at 90% being 10 μm or more, and (d10–d90)/d50 being 2.3 or less; (ii) σ[=log(d20)–log(d80)] being 0.25 or less, wherein σ represents the difference between a logarithm of a pore diameter d20 at a cumulative pore volume corresponding to 20% of the total pore volume and a logarithm of a pore diameter d80 at a cumulative pore volume corresponding to 80% of the total pore volume; and (iii) the maximum of the inclination $S_n=-(V_n-V_{n-1})/[\log(d_n)-\log(d_{n-1})]$ of a curve of a cumulative pore volume to a pore diameter being 3 or more, (Continued)

wherein $d_n$ and $V_n$ are respectively a pore diameter and a cumulative pore volume at an n-th measurement point, and $d_{n-1}$ and $V_{n-1}$ are respectively a pore diameter and a cumulative pore volume at a (n−1)-th measurement point.

4 Claims, 4 Drawing Sheets

(51) Int. Cl.

| | | |
|---|---|---|
| *F01N 3/28* | (2006.01) | |
| *B01J 35/04* | (2006.01) | |
| *B01D 53/94* | (2006.01) | |
| *B01J 23/42* | (2006.01) | |
| *C04B 16/08* | (2006.01) | |
| *C04B 38/00* | (2006.01) | |
| *B01J 29/70* | (2006.01) | |
| *B01J 37/00* | (2006.01) | |
| *B01J 37/08* | (2006.01) | |
| *B28B 3/20* | (2006.01) | |
| *C04B 35/66* | (2006.01) | |
| *C04B 38/06* | (2006.01) | |
| *C04B 111/00* | (2006.01) | |

(52) U.S. Cl.
CPC ............... *B01J 23/42* (2013.01); *B01J 29/70* (2013.01); *B01J 35/04* (2013.01); *B01J 37/0018* (2013.01); *B01J 37/08* (2013.01); *B28B 3/20* (2013.01); *C04B 16/082* (2013.01); *C04B 35/195* (2013.01); *C04B 35/66* (2013.01); *C04B 38/0006* (2013.01); *C04B 38/06* (2013.01); *B01D 2046/2433* (2013.01); *B01D 2046/2437* (2013.01); *B01D 2046/2496* (2013.01); *B01D 2251/208* (2013.01); *B01D 2255/1021* (2013.01); *B01D 2255/915* (2013.01); *B01D 2255/9202* (2013.01); *B01D 2255/9205* (2013.01); *B01D 2258/012* (2013.01); *B28B 2003/203* (2013.01); *C04B 2111/0081* (2013.01)

(56) References Cited

U.S. PATENT DOCUMENTS

| | | | |
|---|---|---|---|
| 7,923,093 B2* | 4/2011 | Melscoet-Chauvel | B01D 46/247 55/523 |
| 7,927,682 B2 | 4/2011 | Beall et al. | |
| 7,964,262 B2 | 6/2011 | Brocheton et al. | |
| 8,119,234 B2 | 2/2012 | Backhaus-Ricoult et al. | |
| 8,636,821 B2 | 1/2014 | Okazaki | |
| 8,663,777 B2 | 3/2014 | Suwabe et al. | |
| 9,011,757 B2 | 4/2015 | Suwabe et al. | |
| 9,074,504 B2 | 7/2015 | Okazaki | |
| 2003/0093982 A1* | 5/2003 | Suwabe | B01D 46/2459 55/523 |
| 2004/0261384 A1 | 12/2004 | Merkel et al. | |
| 2008/0004171 A1 | 1/2008 | Melscoet-Chauvel et al. | |
| 2008/0032090 A1 | 2/2008 | Beall et al. | |
| 2008/0032091 A1 | 2/2008 | Beall | |
| 2008/0057267 A1 | 3/2008 | Brocheton et al. | |
| 2009/0220734 A1 | 9/2009 | Backhaus-Ricoult et al. | |
| 2010/0205921 A1* | 8/2010 | Okazaki | B01D 46/2429 55/523 |
| 2010/0310819 A1 | 12/2010 | Suwabe et al. | |
| 2012/0148792 A1 | 6/2012 | Okazaki | |
| 2012/0317947 A1 | 12/2012 | Okazaki | |
| 2013/0214463 A1 | 8/2013 | Suwabe et al. | |
| 2014/0103560 A1 | 4/2014 | Okazaki | |
| 2015/0251124 A1 | 9/2015 | Okazaki | |

FOREIGN PATENT DOCUMENTS

| | | |
|---|---|---|
| JP | 2009-542570 A | 12/2009 |
| JP | 2011-516371 A | 5/2011 |
| WO | 2009/063997 A1 | 5/2009 |
| WO | 2010/013509 A1 | 2/2010 |
| WO | 2010/103509 A1 | 9/2010 |
| WO | 2011/027837 A1 | 3/2011 |
| WO | 2011/102487 A1 | 8/2011 |

* cited by examiner

CORDIERITE-TYPE CERAMIC HONEYCOMB STRUCTURE AND ITS PRODUCTION METHOD

CROSS REFERENCE TO RELATED APPLICATIONS

This application is a National Stage of International Application No. PCT/JP2014/075273, filed Sep. 24, 2014 (claiming priority based on Japanese Patent Application No. 2013-197083, filed Sep. 24, 2013), the contents of which are incorporated herein by reference in their entirety.

FIELD OF THE INVENTION

The present invention relates to a cordierite-type ceramic honeycomb structure used for a carrier carrying a catalytic material for removing harmful substance from exhaust gases of diesel engines, gasoline engines, etc., particularly used for a carrier carrying a catalytic material for removing nitrogen oxide.

BACKGROUND OF THE INVENTION

Because exhaust gases discharged from internal engines such as diesel engines, gasoline engines, etc. contain nitrogen oxide (NOx) and particulate matter (PM), harmful substances, exhaust pipes of the internal engines are provided with units for removing particulate matter, and units for removing nitrogen oxide. The nitrogen-oxide-removing units include an urea-SCR catalyst, in which urea injected into an exhaust pipe is turned to ammonia, which is reacted with nitrogen oxide in the exhaust gas to remove oxygen therefrom, thereby reducing nitrogen oxide to nitrogen, and thus removing nitrogen oxide from the exhaust gas. Attention is also paid to an HC-SCR catalyst technology using a diesel fuel (HC) as a reducing agent, which can be used without needing sufficient urea-supplying facilities.

An example of ceramic honeycomb structures used as a carrier for the SCR catalyst is shown in FIGS. 1 and 2. A ceramic honeycomb structure 10 comprises porous cell walls 2 defining large numbers of exhaust-gas-flowing paths 3, and an outer peripheral wall 1, with a catalytic material (not shown) carried by the porous cell walls 2.

To remove nitrogen oxide from the exhaust gas efficiently, as large an amount of a catalytic material as possible should be carried per a unit volume, such that the catalytic material carried by an SCR catalyst carrier comes into sufficient contact with the exhaust gas. To this end, an SCR catalyst comprising a ceramic honeycomb structure having thin walls and a high cell density (for example, cell wall thickness: 0.05 mm, and cell wall pitch: 0.85 mm) as a carrier has conventionally been used. Using such honeycomb structure having thin walls and a high cell density, however, each exhaust-gas-flowing cell of the honeycomb structure has a small opening area, resulting in pressure loss at its inlet.

To solve such a problem as increase in pressure loss, JP 2005-052750 A discloses a ceramic honeycomb structure comprising cell walls having thickness of 0.1-0.35 mm, a pitch of 1.0-2.0 mm, an average pore diameter of 15 µm or more, and porosity of 50-80%. JP 2005-052750 A describes that by optimizing the porosity and average pore diameter of cell walls of a honeycomb structure without providing the ceramic honeycomb structure as a catalyst carrier with thin walls and a high cell density, the amount of a catalytic material carried per a unit volume can be increased to improve the cleaning efficiency of a NOx-removing ceramic honeycomb catalyst such as an SCR catalyst, and to reduce its size.

JP 2009-542570 A discloses a cordierite ceramic product having porosity of 64% or more and less than 80%, a median pore diameter d50 of 10-45 µm, a thermal expansion coefficient CTE of $3.0 \times 10^{-7}/°$C. or more, and (i) CTE of less than $6.0 \times 10^{-7}/°$C. at a median pore diameter d50 of 10 µm or more and less than 18 µm, (ii) CTE of less than $9.0 \times 10^{-7}/°$C. at a median pore diameter d50 of 18 µm or more and less than 22 µm, (iii) CTE of less than $10.0 \times 10^{-7}/°$C. at a median pore diameter d50 of 2-25 µm, (iv) CTE of less than $13.0 \times 10^{-7}/°$C. at a median pore diameter d50 of more than 25 µm and less than 29 µm, and (v) CTE of less than $17.0 \times 10^{-7}/°$C. at a median pore diameter d50 of 29-45 µm. It describes that this ceramic product has drastically improved breakage strength coefficient and heat shock resistance despite high porosity, and that even with effective amounts of a catalyst and/or NOx-absorbing material coated, the finely porous ceramic structure secures low pressure loss during cleaning and soot accumulation, thereby making the cordierite ceramic product suitable for catalyst-carrying, wall-flow filters for diesel particles. JP 2009-542570 A further describes that a narrow pore diameter distribution enables a more uniform distribution of a catalyst on pore wall surfaces, resulting in low pressure loss during cleaning and soot accumulation, providing increased chances of contacting the catalyst with soot and the exhaust gas, and thus using the catalyst more efficiently.

JP 2011-516371 A discloses a porous polycrystalline ceramic body having an anisotropic microstructure composed of oriented polycrystalline reticular formations, with an anisotropic factor (Af-pore long) meeting 1.2<Af-pore long<5, which can provide a ceramic item having a narrow pore diameter distribution, porosity of more than 50%, and a median pore diameter in a range of 12-25 µm. It describes that this ceramic item exhibiting high strength, a low thermal expansion coefficient (CTE) and high porosity can be used for substrates for automobiles, diesel or gasoline particulate filters, and functional filters such as catalyst filters having partial or complete NOx-adding functions.

WO 2011/102487 discloses a ceramic honeycomb structure comprising cell walls having (a) porosity of 55-80%, (b) a median pore diameter D50 (measured by mercury porosimetry) of 5-27 µm, (c) pores open on the surface having an opening area ratio of 20% or more, (d) a median opening diameter d50 (based on equivalent circle diameters of pores open on the surface) of 10-45 µm, (e) the density of pores (having equivalent circle diameters of 10 µm or more and less than 40 µm) open on the surface being 350/mm² or more, (f) the maximum inclination of a curve of a cumulative pore volume to a pore diameter being 1.6 or more when the pore diameter distribution is measured by mercury porosimetry, and (g) a ratio D50/d50 of the median pore diameter D50 to the median opening diameter d50 being 0.65 or less. It describes that a ceramic honeycomb filter comprising this ceramic honeycomb structure effectively captures nano-particles largely affecting the number of particles even before PM is accumulated at an initial stage of use, resulting in an improved number-based capturing ratio of PM, with less deterioration of pressure loss characteristics when PM is accumulated.

WO 2011/027837 discloses a ceramic honeycomb structure comprising cell walls having porosity of 40-60%; the opening area ratio of pores open on the cell wall surfaces (the total opening area of pores per a unit cell wall surface area) being 15% or more; the area-based median opening diameter of open pores being 10 μm or more and less than 40 μm, when the opening diameter of each pore open on the cell wall surfaces is expressed by an equivalent circle diameter (diameter of a circle having the same area as the opening area of a pore); the density of pores having equivalent circle diameters of 10 μm or more and less than 40 μm being 350/mm$^2$ or more; and the average circularity of pores having equivalent circle diameters of 10 μm or more and less than 40 μm being 1-2. It describes that because the ceramic honeycomb structure exhibits an improved PM-capturing ratio while keeping low pressure loss, at an early capturing stage after regeneration, it can efficiently capture nano-sized PM, which gathers attention under increasingly stricter exhaust gas regulations.

However, an SCR catalyst comprising as a carrier the ceramic honeycomb structure described in JP 2005-052750 A, the cordierite ceramic product described in JP 2009-542570 A, the porous ceramic body described in JP 2011-516371 A, or the ceramic honeycomb structure used in the ceramic honeycomb filters described in WO 2011/102487 and WO 2011/027837 fails to exhibit satisfactorily high cleaning efficiency under the recent demand of higher cleaning performance and higher efficiency, despite somewhat improved pressure loss characteristics and nitrogen-oxide-removing efficiency. When the amount of a catalytic material carried on cell walls is increased to obtain high cleaning efficiency, exhaust-gas-flowing paths have smaller opening areas, resulting in larger exhaust-gas-flowing resistance, and thus larger pressure loss. Also, an SCR catalyst comprising a carrier using the ceramic honeycomb structure in the ceramic honeycomb filter described in WO 2011/102487 may have insufficient strength.

OBJECT OF THE INVENTION

Accordingly, an object of the present invention is to provide a cordierite-type ceramic honeycomb structure capable of carrying an increased amount of a catalytic material per a unit volume without increasing pressure loss, thereby having higher contact efficiency of an exhaust gas with the catalytic material to be used as a carrier for an SRC catalyst having excellent nitrogen-oxide-removing efficiency, and its production method.

SUMMARY OF THE INVENTION

Thus, the cordierite-type ceramic honeycomb structure of the present invention has large numbers of flow paths partitioned by porous cell walls;
(a) the cell walls having porosity of more than 65% and 75% or less;
(b) in a pore diameter distribution measured by mercury porosimetry,
(i) a pore diameter d10 at a cumulative pore volume (cumulative volume of pores in a range from the maximum pore diameter to a particular pore diameter) corresponding to 10% of the total pore volume being less than 50 μm,
a pore diameter (median pore diameter) d50 at 50% being 18 μm or more and 27 μm or less,
a pore diameter d90 at 90% being 10 μm or more, and (d10−d90)/d50 being 2.3 or less;
(ii) σ[=log(d20)−log(d80)] being 0.25 or less, wherein σ represents the difference between a logarithm of a pore diameter d20 at a cumulative pore volume corresponding to 20% of the total pore volume and a logarithm of a pore diameter d80 at a cumulative pore volume corresponding to 80% of the total pore volume; and
(iii) the maximum of the inclination $S_n=-(V_n-V_{n-1})/[\log(d_n)-\log(d_{n-1})]$ of a curve of a cumulative pore volume to a pore diameter being 3 or more, wherein $d_n$ and $V_n$ are respectively a pore diameter and a cumulative pore volume at an n-th measurement point, and $d_{n-1}$ and $V_{n-1}$ are respectively a pore diameter and a cumulative pore volume at a (n−1)-th measurement point.

Pores open on the cell wall surfaces preferably have (i) an opening area ratio of 25-50%, and (ii) an area-based median opening diameter (expressed by equivalent circle diameter) of 25-50 μm.

The maximum of the $S_n$ is preferably 3.5 or more, more preferably 4.0 or more.

The method of the present invention for producing a cordierite-type ceramic honeycomb structure comprises the steps of extruding a moldable material comprising a ceramic material and a pore-forming material constituted by inorganic-powder-coated, hollow resin particles to form a predetermined green body, and drying and sintering the green body;

the moldable material containing 8-16% by mass of the pore-forming material, per 100% by mass of the ceramic material;

the pore-forming material having a median diameter D50 of 25-35 μm, a particle diameter D10 (at a cumulative volume corresponding to 10% of the total volume) of 14-24 μm, and a particle diameter D90 (at a cumulative volume corresponding to 90% of the total volume) of 45-60 μm, in a curve expressing the relation of a particle diameter to a cumulative volume (cumulative volume of particles having diameters equal to or smaller than a particular particle diameter), a particle diameter distribution deviation SD=log(D80)−log(D20) being 0.4 or less, wherein D20 is a particle diameter at a cumulative volume corresponding to 20% of the total volume, and D80 is a particle diameter at a cumulative volume corresponding to 80% of the total volume, D20<D80; and the pore-forming material having the maximum compression recovery Lmax of 3.0 mm or more, and a compression recovery L in a compression stress range of 2-6 MPa, which is 80% or more of the maximum compression recovery Lmax.

The compression recovery L is defined by the returning distance (mm) of a piston having an outer diameter of 8 mm applying predetermined compression stress to 0.3 g of a pore-forming material in a metal cylinder having an inner diameter of 8 mm and a depth of 100 mm, when the pore-forming material is relieved of the compression stress. The maximum compression recovery Lmax is the maximum of the compression recovery L.

It is preferable that
15-25% by mass of silica, 27-43% by mass of talc, and 15-30% by mass of alumina are contained in 100% by mass of the cordierite-forming material, a sum of the ceramic material and the inorganic powder;
the silica has a median diameter D50 of 15-30 μm, the percentage of particles having diameters of 10 μm or less being 3% or less by mass, the percentage of particles having diameters of 100 μm or more being 3% or less by mass, and the particle diameter distribution deviation SD being 0.4 or less;
the talc has a median diameter D50 of 1-10 μm, and a particle diameter distribution deviation SD of 0.6 or less; and the alumina has a median diameter D50 of 1-8 μm, the particle diameter D90 at a cumulative volume corresponding to 90% of the total volume being 5-15 μm in a curve expressing the relation of a particle diameter to a cumulative volume.

The inorganic powder on the pore-forming material is preferably at least one selected from the group consisting of kaolin, silica, talc, cordierite, alumina, aluminum hydroxide, calcium carbonate, and titanium oxide.

The inorganic powder on the pore-forming material preferably has a median diameter D50 of 0.5-10 μm.

DESCRIPTION OF THE PREFERRED EMBODIMENTS

DESCRIPTION OF THE PREFERRED EMBODIMENTS

[1] Cordierite-Type Ceramic Honeycomb Structure

Figure 1:
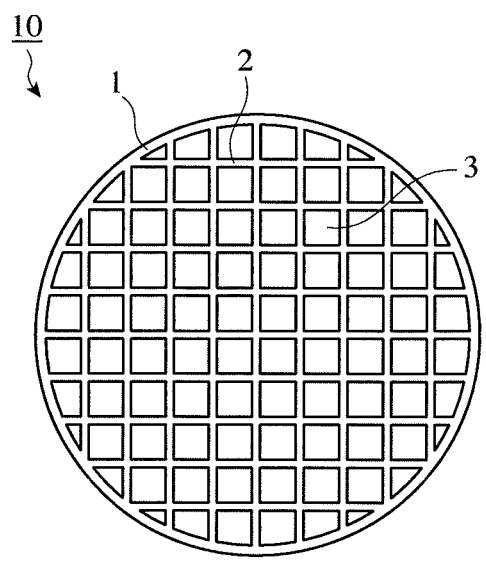
FIG. 1 is a front view schematically showing an example of ceramic honeycomb structures.
Figure 2:
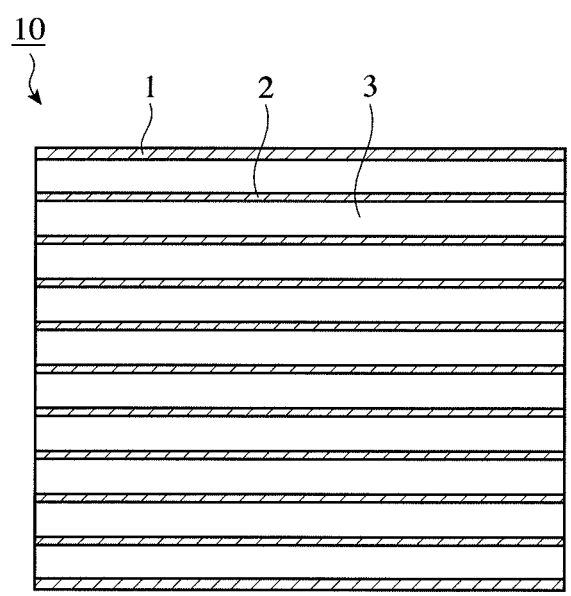
FIG. 2 is a longitudinal cross-sectional view schematically showing an example of ceramic honeycomb structures.

The cordierite-type ceramic honeycomb structure of the present invention has large numbers of flow paths partitioned by porous cell walls;
(a) the cell walls having porosity of more than 65% and 75% or less;
(b) in a pore diameter distribution measured by mercury porosimetry,
(i) a pore diameter d10 at a cumulative pore volume (cumulative volume of pores in a range from the maximum pore diameter to a particular pore diameter) corresponding to 10% of the total pore volume being less than 50 μm,
a pore diameter (median pore diameter) d50 at 50% being 18 μm or more and 27 μm or less,
a pore diameter d90 at 90% being 10 μm or more, and (d10−d90)/d50 being 2.3 or less;
(ii) σ[=log(d20)−log(d80)] being 0.25 or less, wherein σ represents the difference between a logarithm of a pore diameter d20 at a cumulative pore volume corresponding to 20% of the total pore volume and a logarithm of a pore diameter d80 at a cumulative pore volume corresponding to 80% of the total pore volume;
(iii) the maximum of the inclination $S_n = -(V_n - V_{n-1})/[\log(d_n) - \log(d_{n-1})]$ of a curve of a cumulative pore volume to a pore diameter being 3 or more, wherein $d_n$ and $V_n$ are respectively a pore diameter and a cumulative pore volume at an n-th measurement point, and $d_{n-1}$ and $V_{n-1}$ are respectively a pore diameter and a cumulative pore volume at a (n−1)-th measurement point.

Pores open on the cell wall surfaces preferably have an opening area ratio of 25-50%, and an area-based median opening diameter (expressed by equivalent circle diameter) of 25-50 μm.

The cordierite-type ceramic honeycomb structure having such a structure can carry a larger amount of a catalytic material per a unit volume without increasing pressure loss, to have higher contact efficiency of an exhaust gas with the catalytic material, thereby providing an SRC catalyst having excellent nitrogen-oxide-removing efficiency.

(a) Porosity of Cell Walls

The cell walls have porosity of more than 65% and 75% or less. The porosity of 65% or less provides large pressure loss, and the porosity of more than 75% provides the cell walls with low strength. The porosity is preferably 67-73%, more preferably 68-72%. The porosity of cell walls is measured by mercury porosimetry described below.

(b) Pore Distribution of Cell Walls (i) d10, d50 and d90

Figure 3:
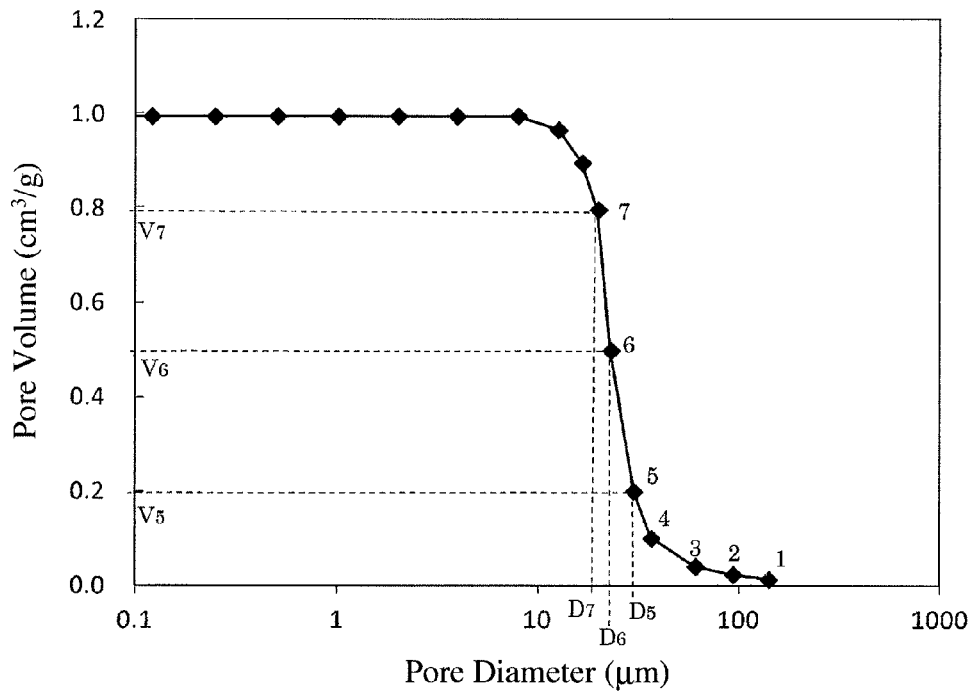
FIG. 3 is a graph showing the relation between a pore diameter and a pore volume measured by mercury porosimetry (cumulative pore volume curve), in the cell walls of the ceramic honeycomb structure of Example 4.

In the pore diameter distribution curve of cell walls measured by mercury porosimetry, a pore diameter d10 at a cumulative pore volume corresponding to 10% of the total pore volume is less than 50 μm, a pore diameter (median pore diameter) d50 at 50% is 18 μm or more and 27 μm or less, a pore diameter d90 at 90% is 10 μm or more, and (d10−d90)/d50 is 2.3 or less. The pore diameter distribution curve of the cell walls measured by mercury porosimetry is a curve of a cumulative pore volume plotted against a pore diameter (cumulative pore volume curve), as shown in FIG. 3, and the cumulative pore volume is a cumulative volume of pores in a range from the maximum pore diameter to a particular pore diameter. d10>d50>d90.

The median pore diameter d50 of less than 18 μm makes it difficult to carry a catalytic material in pores open on wall surfaces, resulting in more catalyst carried on the cell wall surfaces, and thus smaller opening areas of exhaust-gas-flowing paths. As a result, there is large pressure loss due to large resistance to the exhaust gas flow. On the other hand, the median pore diameter d50 of more than 27 μm provides low strength. The lower limit of the median pore diameter d50 is preferably 19 μm, more preferably 20 μm. The upper limit of the median pore diameter d50 is preferably 25 μm, more preferably 23 μm.

When the pore diameter d10 at a cumulative pore volume corresponding to 10% of the total pore volume is more than 50 μm, the honeycomb structure has low strength, though a lot of a catalytic material is easily carried in pores open on cell wall surfaces. d10 is preferably 48 μm or less, more preferably 45 μm or less. Further, d10 is preferably 25 μm or more, more preferably 28 μm or more.

When the pore diameter d90 at a cumulative pore volume corresponding to 90% of the total pore volume is less than 10 μm, a catalytic material cannot be easily carried in pores open on wall surfaces, resulting in more catalyst carried on the cell wall surfaces, and thus small opening areas of exhaust-gas-flowing paths. As a result, there is large pressure loss due to large exhaust-gas-flowing resistance. d90 is preferably 12 μm or more, more preferably 15 μm or more. Further, d90 is preferably 22 μm or less, more preferably 20 μm or less.

When (d10−d90)/d50 is more than 2.3, the pore diameter d10 may be more than 50 μm, or the pore diameter d90 may be less than 10 μm, so that a catalytic material cannot be easily carried in pores open on wall surfaces, resulting in more catalyst carried on the cell wall surfaces, and thus small opening areas of exhaust-gas-flowing paths. As a result, there is large pressure loss due to large exhaust-gas-flowing resistance. (d10–d90)/d50 is preferably 1.8 or less, more preferably 1 or less.

(ii) d20 and d80

In the pore diameter distribution curve of cell walls measured by mercury porosimetry, σ[=log(d20)–log(d80)] is 0.25 or less, wherein σ represents the difference between a logarithm of a pore diameter d20 at a cumulative pore volume corresponding to 20% of the total pore volume and a logarithm of a pore diameter d80 at a cumulative pore volume corresponding to 80% of the total pore volume. When σ is more than 0.25, there is large difference between the pore diameter d20 and the pore diameter d80, meaning that the pore diameter d20 is larger (or the pore diameter d80 is smaller) than when σ is 0.25 or less. Accordingly, it is difficult to keep a catalytic material carried in pores open on wall surfaces, resulting in more catalyst carried on cell wall surfaces, and thus smaller opening areas of exhaust-gas-flowing paths. As a result, there is larger resistance for the exhaust gas to flow, resulting in larger pressure loss. σ is preferably 0.2 or less, more preferably 0.17 or less.

(iii) Maximum of Inclination of Cumulative Pore Volume Curve of Cell Walls

The maximum of the inclination $S_n=-(V_n-V_{n-1})/[\log(d_n)-\log(d_{n-1})]$ of a curve expressing the relation of a cumulative pore volume to a pore diameter (logarithm) is 3 or more, wherein $d_n$ and $V_n$ are respectively a pore diameter and a cumulative pore volume at an n-th measurement point, and $d_{n-1}$ and $V_{n-1}$ are respectively a pore diameter and a cumulative pore volume at a (n–1)-th measurement point. The curve of a cumulative pore volume is obtained by plotting a cumulative pore volume (cm$^3$/g) against a logarithm of a pore diameter (μm). When the maximum of the inclination $S_n$ is less than 3, there are many large pores and small pores, resulting in less catalytic material carried in small pores, and more catalyst carried on the cell wall surfaces. As a result, exhaust-gas-flowing paths have small opening areas, resulting in large exhaust-gas-flowing resistance, and thus large pressure loss. The maximum of the inclination $S_n$ is preferably 3.5 or more, further preferably 4 or more, still further preferably 4.5 or more, most preferably 5 or more.

(iv) Mercury Porosimetry

The measurement of a cumulative pore volume by mercury porosimetry can be conducted, for example, by using Autopore III 9410 available from Micromeritics. A test piece cut out of the cordierite-type ceramic honeycomb structure is set in a measurement cell, and the cell is evacuated. Thereafter, mercury is introduced into the cell under pressure to measure the volume of mercury pressed into pores in the test piece. Because mercury is introduced into finer pores at higher pressure, the relation between a pore diameter and a cumulative pore volume (cumulative volume of pores in a range from the maximum pore diameter to a particular pore diameter) is determined from the relation between pressure and the volume of mercury intruded into pores. Mercury is first introduced into large pores and then into smaller pores successively.

The porosity can be calculated from the total pore volume, using 2.52 g/cm$^3$ as the true density of cordierite.

Each of d10, d20, d50 (median diameter), d80 and d90 represents a pore diameter (μm) at each pore volume corresponding to 10%, 20%, 50%, 80% and 90% of the total pore volume, in the curve of a cumulative pore volume to a pore diameter.

The inclination $S_n$ of a cumulative pore volume curve at an n-th measurement point can be determined from a pore diameter $d_{n-1}$ (μm) and a cumulative pore volume $V_{n-1}$ (cm$^3$/g) at a (n–1)-th measurement point from the start of measurement, and a pore diameter $d_n$ (μm) and a cumulative pore volume $V_n$ (cm$^3$/g) at an n-th measurement point, in a curve expressing the relation between a pore diameter and a cumulative pore volume determined by mercury porosimetry, by the formula of $S_n=-(V_n-V_{n-1})/[\log(d_n)-\log(d_{n-1})]$. The maximum of the inclination $S_n$ is preferably used as the maximum inclination of the curve of a cumulative pore volume to a pore diameter. Measurement intervals in mercury porosimetry are preferably as small as possible. Particularly in a sample having narrow pore diameter variations, measurement is conducted preferably with as small intervals as possible.

Figure 4:
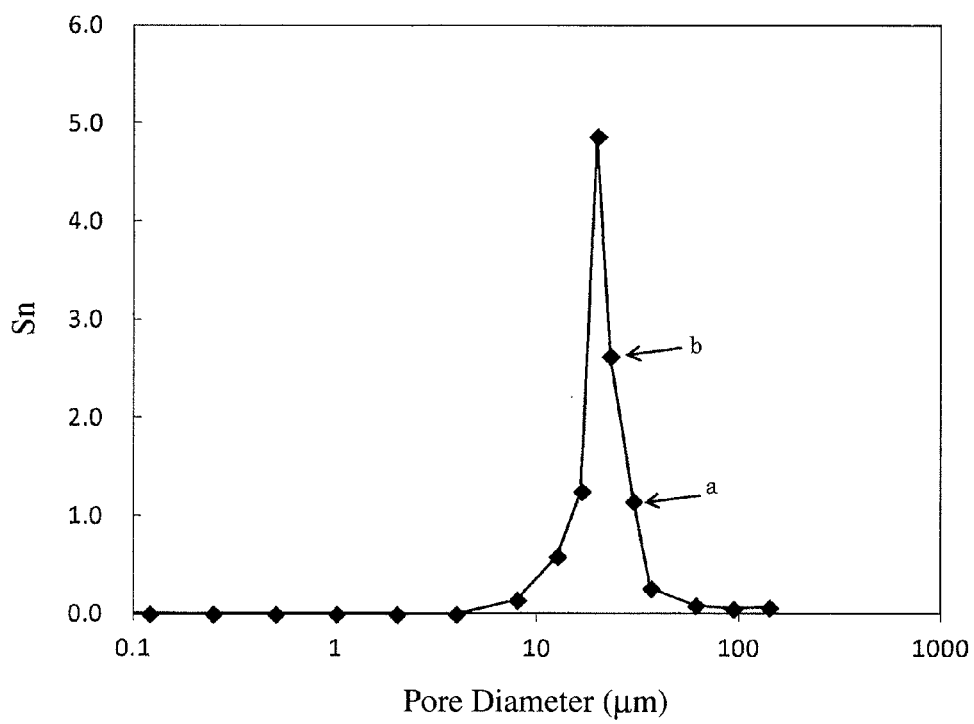
FIG. 4 is a graph showing the inclination $S_n$ of the cumulative pore volume curve of Example 4, which is plotted against a pore diameter.

The measured inclination $S_n$ is exemplified in FIG. 4. The graph of FIG. 4 is determined from the cumulative pore volume curve of FIG. 3 obtained by mercury porosimetry. For example, a point α in FIG. 4 represents an inclination $S_6=-(V_6-V_5)/(\log d_6-\log d_5)$, which is determined from pore diameters $D_5$ and $D_6$ and cumulative pore volumes $V_5$ and $V_6$ at the fifth and sixth measurement points from the start of measurement in the cumulative pore volume curve shown in FIG. 3, and a point b represents an inclination $S_7=-(V_7-V_6)/(\log d_7-\log d_6)$, which is determined from pore diameters $d_6$ and $d_7$ and cumulative pore volumes $V_6$ and $V_7$ at the sixth and seventh measurement points.

(c) Structure of Pores Open on Cell Wall Surfaces (i) Opening Area Ratio of Pores Open on Cell Wall Surfaces The opening area ratio of pores open on cell wall surfaces is preferably 25-50%. The opening area ratio is the total area of pore openings per a unit cell wall surface area. It is determined by measuring the total area of pore openings on an electron photomicrograph of a cell wall surface, by an image analyzer (for example, Image-Pro Plus ver. 3.0 available from Media Cybernetics), and dividing it by a measured field area.

When the opening area ratio is less than 25%, a catalytic material is not easily carried in pores open on the wall surfaces, resulting in more catalyst carried on the cell wall surfaces. As a result, exhaust-gas-flowing paths have small opening areas, resulting in large exhaust-gas-flowing resistance, and thus large pressure loss. On the other hand, the opening area ratio of more than 50% provides the honeycomb structure with low strength. The opening area ratio is preferably 27-48%, more preferably 30-45%.

Figure 5:
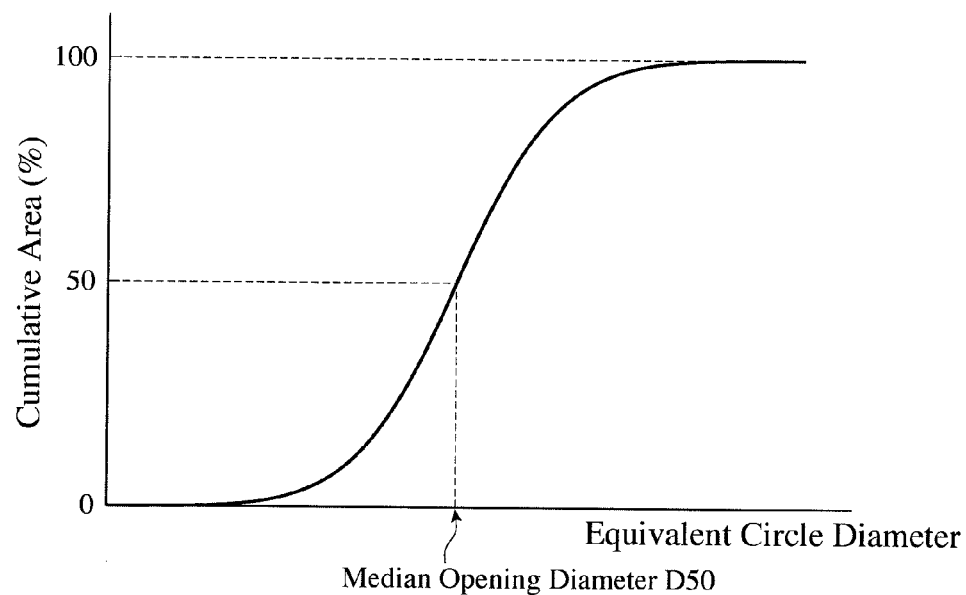
FIG. 5 is a graph schematically showing the relation between an equivalent circle diameter and a cumulative area, with respect to pores open on the cell wall surfaces of the ceramic honeycomb structure.

(ii) Area-Based Median Diameter (Expressed by Equivalent Circle Diameter) of Pores Open on Cell Wall Surfaces The area-based median diameter (expressed by equivalent circle diameter) of pores open on the cell wall surfaces, which is called median opening diameter, is preferably 25-50 μm. The median opening diameter is an equivalent circle diameter of a pore at a cumulative area corresponding to 50% of the total pore area, in a graph of a cumulative area of pores open on the cell wall surfaces (cumulative opening area of pores having diameters equal to or smaller than a particular equivalent circle diameter) plotted against an equivalent circle diameter (a diameter of a circle having the same area as the opening area of each pore) of an open pore as shown in FIG. 5. The opening areas and equivalent circle diameters of pores can be determined on an electron photomicrograph of a cell wall surface by an image analyzer (for example, Image-Pro Plus ver. 6.3 available from Media Cybernetics).

When the median opening diameter is less than 25 μm, less catalytic material is carried in pores open on cell wall surfaces, and more catalyst is carried on cell wall surfaces, resulting in smaller opening areas of exhaust-gas-flowing paths. As a result, there is larger resistance for the exhaust gas to flow, resulting in larger pressure loss. On the other hand, the median opening diameter of more than 50 μm provides the ceramic honeycomb structure with reduced strength. The median opening diameter is preferably 27-48 μm, more preferably 30-45 μm.

(d) Thermal Expansion Coefficient

The cordierite-type ceramic honeycomb structure preferably has a thermal expansion coefficient of $13 \times 10^{-7}/°C$ or less between 40° C. and 800° C. in a flow path direction. Because the cordierite-type ceramic honeycomb structure having such a thermal expansion coefficient has high heat shock resistance, it is sufficiently useful for, for example, as a ceramic honeycomb filter for removing particulate matter from the exhaust gas discharged from diesel engines. The above thermal expansion coefficient is preferably $3 \times 10^{-7}$ to $11 \times 10^{-7}$, more preferably, $5 \times 10^{-7}$ to $10 \times 10^{-7}$.

(e) Structure of Cell Walls

The cordierite-type ceramic honeycomb structure preferably has an average cell wall thickness of 5-15 mil (0.127-0.381 mm) and an average cell density of 150-300 cpsi (23.3-46.5 cells/cm$^2$). Such a cell wall structure results in an increased amount of a catalytic material carried, improving the contact efficiency of an exhaust gas with the catalytic material, and pressure loss characteristics. The average cell wall thickness of less than 5 mil provides the cell walls with low strength, while the average cell wall thickness of more than 15 mil cannot provide low pressure loss. It is preferably 6-12 mil (0.152-0.305 mm). The average cell density of less than 150 cpsi provides the cell walls with low strength, and the average cell density of more than 300 cpsi cannot provide low pressure loss.

Figure 6:
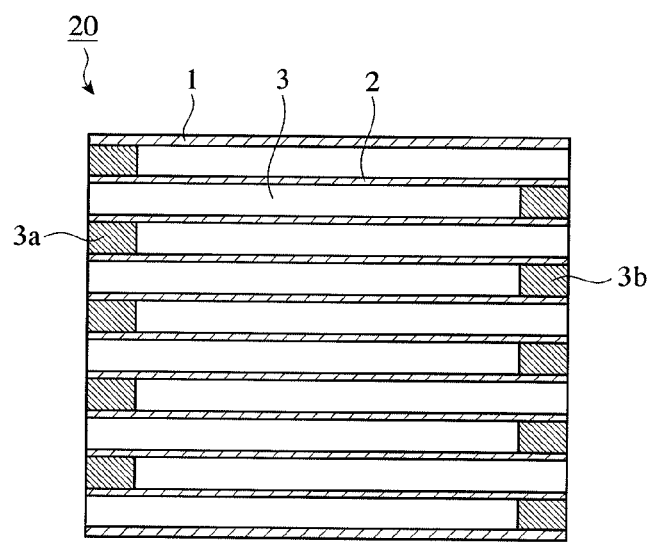
FIG. 6 is a longitudinal cross-sectional view schematically showing an example of ceramic honeycomb filters.

The cross section shape of each cell when viewed in a flow path direction may be polygonal such as square, hexagonal, etc., circular, elliptical, etc., and may be asymmetric with different sizes between the inlet and the outlet. The ceramic honeycomb structure may be used not only as a carrier of an SRC catalyst, an object of the present invention, but also as a ceramic honeycomb filter 20 with ends 3a, 3b of predetermined flow paths 3 plugged alternately by a known method as shown in FIG. 6.

(f) Materials of Cell Walls

A material for the cell walls comprises cordierite having excellent heat shock resistance and a low thermal expansion coefficient as a main crystal, because the ceramic honeycomb structure is used for a carrier or a filter for cleaning an exhaust gas discharged from internal engines such as diesel engines, gasoline engines, etc. When the main crystal phase is cordierite, the material may contain other crystal phases such as spinel, mullite, sapphirine, etc., and further glass components.

[2] Production Method of Cordierite-Type Ceramic Honeycomb Structure

The method of the present invention for producing a cordierite-type ceramic honeycomb structure comprises the steps of extruding a moldable material comprising a ceramic material and a pore-forming material constituted by inorganic-powder-coated, hollow resin particles to a predetermined green body, and drying and sintering the green body;

the moldable material containing 8-16% by mass of the pore-forming material, per 100% by mass of the ceramic material;

the pore-forming material having a median diameter D50 of 25-35 μm, a particle diameter D10 (at a cumulative volume corresponding to 10% of the total volume) of 14-24 μm, and a particle diameter D90 (at a cumulative volume corresponding to 90% of the total volume) of 45-60 μm, in a curve expressing the relation of a particle diameter to a cumulative volume (cumulative volume of particles having diameters equal to or smaller than a particular particle diameter), a particle diameter distribution deviation SD [=log(D80)−log(D20)] being 0.4 or less, wherein D20 is a particle diameter at a cumulative volume corresponding to 20% of the total volume, and D80 is a particle diameter at a cumulative volume corresponding to 80% of the total volume, D20<D80; and the pore-forming material having the maximum compression recovery Lmax of 3.0 mm or more, and a compression recovery L in a compression stress range of 2-6 MPa, which is 80% or more of the maximum compression recovery Lmax.

The compression recovery L is defined by the returning distance (mm) of a piston having an outer diameter of 8 mm applying a predetermined compression stress to 0.3 g of a pore-forming material in a metal cylinder having an inner diameter of 8 mm and a depth of 100 mm, when the pore-forming material is relieved of the compression stress. The maximum compression recovery Lmax is the maximum of the compression recovery L.

It is preferable that 15-25% by mass of silica, 27-43% by mass of talc, and 15-30% by mass of alumina are contained in 100% by mass of a cordierite-forming material, a sum of the ceramic material and the inorganic powder;

the silica has a median diameter D50 of 15-30 μm, the percentage of particles having diameters of 10 μm or less being 3% or less by mass, the percentage of particles having diameters of 100 μm or more being 3% or less by mass, and a particle diameter distribution deviation SD being 0.4 or less;

the talc has a median diameter D50 of 1-10 μm, and a particle diameter distribution deviation SD of 0.6 or less, and the alumina has a median diameter D50 of 1-8 μm, a particle diameter D90 at a cumulative volume corresponding to 90% of the total volume being 5-15 μm in a curve expressing the relation of a particle diameter to a cumulative volume.

Such method can produce the cordierite-type ceramic honeycomb structure of the present invention having (a) porosity of more than 65% and 75% or less;

(b) in a pore diameter distribution measured by mercury porosimetry, (i) a pore diameter d10 at a cumulative pore volume corresponding to 10% of the total pore volume being less than 50 μm, a pore diameter (median pore diameter) d50 at 50% being 18-27 μm, a pore diameter d90 at 90% being 10 μm or more, and (d10−d90)/d50 being 2.3 or less;

(ii) σ [=log(d20)−log(d80)] being 0.25 or less, wherein σ represents the difference between a logarithm of a pore diameter d20 at a cumulative pore volume corresponding to 20% of the total pore volume and a logarithm of a pore diameter d80 at a cumulative pore volume corresponding to 80% of the total pore volume;

(iii) the maximum of the inclination $S_n = -(V_n - V_{n-1})/[\log(d_n) - \log(d_{n-1})]$ of a curve of a cumulative pore volume to a pore diameter being 3 or more, wherein $d_n$ and $V_n$ are respectively a pore diameter and a cumulative pore volume at an n-th measurement point, and $d_{n-1}$ and $V_{n-1}$ are respectively a pore diameter and a cumulative pore volume at a (n−1)-th measurement point; and (c) pores open on the surface having (i) an opening area ratio of 25-50%, and (ii) an area-based median opening diameter D50 of 25-50 μm when expressed by equivalent circle diameter.

Pores formed in ceramics include pores formed by melting the ceramic material in a sintering process, and pores formed by burning off the pore-forming material. Accordingly, pores formed by sintering ceramics can be controlled by adjusting the median diameters and particle diameter distributions of the ceramic material and the pore-forming material.

The production method of the present invention uses as a pore-forming material hollow resin particles coated with inorganic powder, which has the maximum compression recovery Lmax of 3.0 mm or more, a compression recovery L in a compression stress range of 2-6 MPa being 80% or more of the maximum compression recovery Lmax. Accordingly, in the sintering of a green body comprising the ceramic material and the pore-forming material, pores having a desired pore diameter distribution are formed by burning off the resin particles and sintering the ceramic material and the inorganic powder on the resin particles. In this process, the inorganic powder on the resin particles are sintered together with the surrounding ceramic material, resulting in improved communication of pores from cell wall surfaces to inside, so that the diameters (measured by mercury porosimetry) of pores in the cell walls and the opening area ratio of pores open on the cell wall surfaces are within the above ranges. Also, by using hollow resin particles generating less heat than solid resin particles in burning, cracking unlikely occurs in the sintering process of the green body. The compression recovery L is defined by the returning distance (mm) of a piston having an outer diameter of 8 mm applying a predetermined compression stress to 0.3 g of a pore-forming material in a metal cylinder having an inner diameter of 8 mm and a depth of 100 mm, when the pore-forming material is relieved of the compression stress. The maximum compression recovery Lmax is the maximum of the compression recovery L.

Thus, pores formed by sintering the ceramic material and the inorganic powder on the resin particles, and pores formed from the pore-forming material are well communicating with each other in predetermined pore diameter ranges, resulting in a cordierite-type ceramic honeycomb structure capable of carrying an increased amount of a catalytic material with improved pressure loss characteristics.

(1) Pore-Forming Material (a) Structure

The pore-forming material used in the present invention is constituted by hollow resin particles coated with inorganic powder. The inorganic powder is preferably attached to the surfaces of hollow resin particles.

The amount of the pore-forming material added is 8-16% by mass, per 100% by mass of the ceramic material. Outside this amount range of the pore-forming material, it is difficult to obtain cell walls having the above pore structure. When the amount of the pore-forming material added is less than 8% by mass, it is difficult to provide the cell walls with porosity of more than 65%, resulting in a reduced amount of a catalytic material carried, and thus poorer pressure loss characteristics. When the amount of the pore-forming material added is more than 16% by mass, the cell walls may have porosity of more than 75%, resulting in low strength. The amount of the pore-forming material added is preferably 10-15% by mass, more preferably 11-14% by mass.

The pore-forming material particles (including inorganic powder) have a median diameter D50 of 25-35 μm. The median diameter D50 of less than 25 μm provides poor pressure loss characteristics. When the median diameter D50 is more than 35 μm, coarse pores are formed, resulting in a smaller amount of the catalytic material carried, and thus low contact efficiency of an exhaust gas with the catalytic material. The median diameter D50 of the pore-forming material particles is preferably 27-33 μm, more preferably 28-32 μm.

The pore-forming material particles have a particle diameter D10 (at a cumulative volume corresponding to 10% of the total volume) of 14-24 μm, a particle diameter D90 (at a cumulative volume corresponding to 90% of the total volume) of 45-60 μm, and a particle diameter distribution deviation SD of 0.4 or less, in a curve expressing the relation of a particle diameter to a cumulative volume (cumulative volume of particles in a particle diameter range equal to or less than a particular level). The particle diameters of pore-forming material particles can be measured, for example, by a particle diameter distribution meter (Microtrack MT3000 available from Nikkiso Co., Ltd.). The particle diameter D10 is preferably 15-23 μm, D90 is preferably 47-58 μm, and the particle diameter distribution deviation SD is preferably 0.35 or less, more preferably 0.3 or less.

The particle diameter distribution deviation SD is expressed by SD=log(D80)−log(D20), wherein D20 is a particle diameter at a cumulative volume corresponding to 20% of the total volume, and D80 is a particle diameter at a cumulative volume corresponding to 80% of the total volume, in a curve expressing the relation of a particle diameter to a cumulative volume. D20<D80.

As described later, the pore-forming material is constituted by hollow resin particles containing a hydrocarbon gas, etc., which are deformed by pressure or shearing, so that resin shells may be broken, failing to keep their shapes. Because the moldable material is extruded, for example, at pressure of 5 MPa or more, it is considered that hollow resin particles constituting the pore-forming material are deformed by compression during extrusion, resulting in partial breakage. Though the pore-forming material deformed by compression recovers its original shape when returned to normal pressure after extrusion (springback phenomenon), keeping its inherent function, the broken pore-forming material cannot exhibit its own function. Accordingly, the pore-forming material should have such property that it is deformed without breakage under extrusion pressure or higher pressure, and recovers its original shape when the pressure is relieved (compression recoverability).

Figure 7:
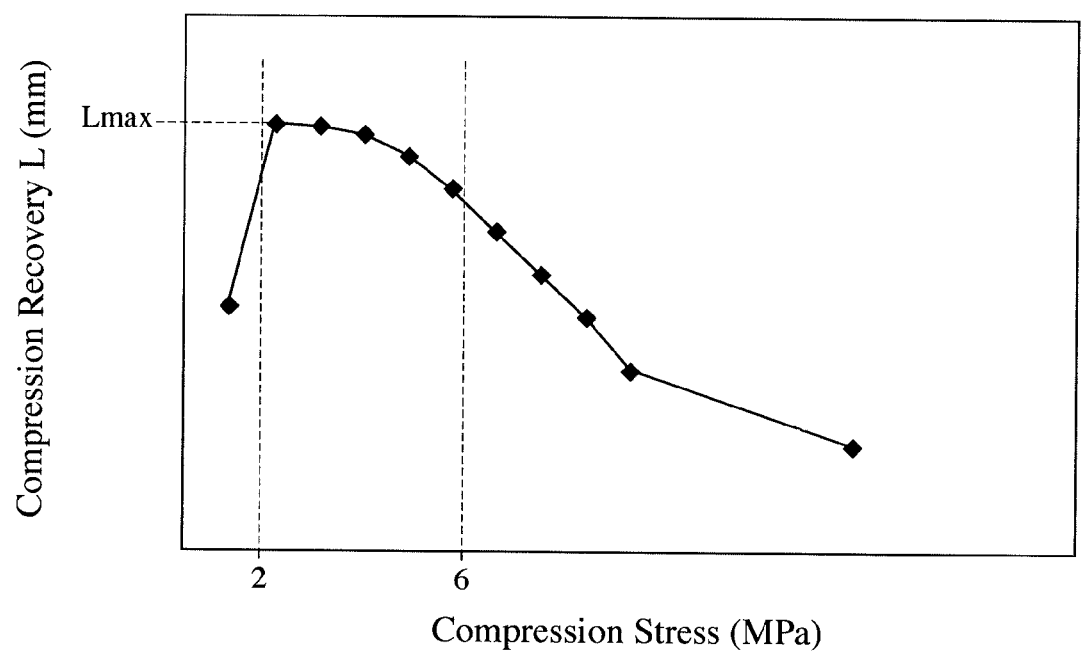
FIG. 7 is a graph showing an example of the measured compression recoverabilities of a pore-forming material.

The compression recoverability of the pore-forming material is evaluated by measuring compression recovery L by a compression recoverability test described below. The compression recoverability test is conducted by introducing 0.3 g of a pore-forming material into a metal cylinder having an inner diameter of 8 mm and a depth of 100 mm, applying a predetermined compression stress to the pore-forming material by a piston having an outer diameter of 8 mm (mass: 96.45 g), and measuring the distance (mm) of the piston returning from the compressed state after removing the compression stress. The returning distance of the piston is defined as a compression recovery L. When the compression recovery L is measured with varied compression stress, an upward projecting curve is obtained as shown in FIG. 7. The maximum of the compression recovery L in a measured range is the maximum compression recovery Lmax. The compression recoverability is evaluated by (a) the maximum compression recovery Lmax, and (b) a ratio L/Lmax of compression recovery L in a compression stress range of 2-6 MPa to the maximum compression recovery Lmax.

The pore-forming material used in the present invention has the maximum compression recovery Lmax of 3.0 mm or more, and the compression recovery L in a compression stress range of 2-6 MPa is 80% or more of the maximum compression recovery Lmax (L/Lmax≥80%), namely, the minimum of the compression recovery L in a range compression stress of 2-6 MPa is 80% or more of the maximum compression recovery Lmax. In the pore-forming material having such compression recoverability, only few particles are broken by extrusion compression, so that a function as a pore-forming material can be sufficiently kept.

The pore-forming material particles preferably have sphericity of 0.5 or more. When the sphericity of the pore-forming material particles is less than 0.5, more pores on the cell walls undesirably have acute-angle corners, which may act as starting points of breakage, likely resulting in providing the honeycomb structure with lower strength. The sphericity of the pore-forming material particles is preferably 0.7 or more, more preferably 0.8 or more. The sphericity of a pore-forming material particle is determined by dividing a projected area of the pore-forming material particle by an area of a circle having a diameter equal to the longest straight line passing the center of gravity of the pore-forming material particle and connecting two points on the periphery, and can be determined by an image analyzer on an electron photomicrograph.

(b) Resin Particles

The hollow resin particles are preferably foamed resin particles, particularly foamed resin balloons. Resins for the pore-forming material particles are suitably polymethylmethacrylate, polybutylmethacrylate, polyacrylate, polystyrene, acrylics, polyethylene, polyethylene terephthalate, methylmethacrylate-acrylonitrile copolymers, etc. The hollow resin particles preferably have shell thickness of 0.1-3 μm, containing a hydrocarbon gas, etc.

(c) Inorganic Powder

The inorganic powder is preferably at least one selected from the group consisting of kaolin, silica, talc, cordierite, alumina, aluminum hydroxide, calcium carbonate and titanium oxide. Among them, kaolin, silica, talc, cordierite, alumina and aluminum hydroxide are preferable, and talc is most preferable.

To form well-communicating pores by sintering the ceramic material and the inorganic powder, the median diameter D50 of the inorganic powder is preferably 0.5-15 μm, more preferably 0.6-12 μm, most preferably 0.6-10 μm. The particle diameters of the inorganic powder can be measured by a particle diameter distribution meter (Microtrack MT3000 available from Nikkiso Co., Ltd.).

The median diameter d of the inorganic powder is preferably selected relative to the median diameter D of the hollow resin particles, such that d/D is 0.5 or less. With the d/D in the above range, the inorganic powder can be well attached to the resin particles. When the inorganic powder is selected to have d/D of more than 0.5, the inorganic powder is not easily attached to the resin particles, resulting in less effect of the inorganic powder for communicating pores formed by sintering the ceramic material with pores formed by the resin particles, and thus poor communicability of pores from the cell wall surfaces to the inside. d/D is preferably 0.01-0.45.

(2) Ceramic Material

The composition of the ceramic material is adjusted to form a cordierite-forming material, including inorganic powder attached to the pore-forming material. The cordierite-forming material is obtained by mixing silica source powder, alumina source powder and magnesia source powder, to form cordierite (the chemical composition of main components are 42-56% by mass of $SiO_2$, 30-45% by mass of $Al_2O_3$, and 12-16% by mass of MgO) as a main crystal. The ceramic material and the inorganic powder preferably constitute a cordierite-forming material, which contains 15-25% by mass of silica, 27-43% by mass of talc, and 15-30% by mass of alumina based on the total amount (100% by mass) of the ceramic material and the inorganic powder (cordierite-forming material). Pores formed in ceramics composed of cordierite as a main crystal comprise pores formed by melting the ceramic material during sintering, and pores formed by burning off the pore-forming material. Accordingly, by adjusting the particle diameters and particle diameter distributions of the pore-forming material and the ceramic material (kaolin, silica, talc, alumina, etc.), it is possible to control pores formed during the sintering of cordierite-type ceramics. Among them, silica has large contribution to the pore structure together with the pore-forming material, because it forms pores by a diffusion reaction with surrounding materials.

(a) Silica

It is known that silica remains more stable at high temperatures than other materials, and melted and diffused at 1300° C. or higher to form pores. Accordingly, a desired amount of pores can be obtained by containing 15-25% by mass of silica in the cordierite-forming material. When more than 25% by mass of silica is added, the amounts of kaolin and/or talc, other silica sources, should be reduced to keep cordierite as a main crystal, reducing the effect of kaolin for having small thermal expansion, which is obtained by the orientation of kaolin in extrusion, resulting in low heat shock resistance. On the other hand, the addition of less than 15% by mass of silica reduces the number of pores open on cell wall surfaces, resulting in a smaller amount of a catalytic material carried, and poorer pressure loss characteristics. When the pore-forming material coated with silica as the inorganic powder is used, the amount of silica in the cordierite-forming material is properly adjusted, taking into account the amount of silica in the pore-forming material.

Silica used has a median diameter D50 of 15-30 μm, containing 3% or less by mass of particles having diameters of 10 μm or less, and 3% or less by mass of particles having diameters of 100 μm or more, with a particle diameter distribution deviation SD of 0.4 or less. A combination of silica particles having such particle diameters and particle diameter distribution with the pore-forming material provides an extremely sharp pore diameter distribution.

When silica has a median diameter D50 of less than 15 μm, pores open on the cell wall surfaces contain more pressure-loss-increasing fine pores. On the other hand, when D50 is more than 30 μm, there are too many coarse pores, resulting in reduced contact efficiency of an exhaust gas with the catalytic material. The median diameter D50 of silica is preferably 17-28 μm, more preferably 19-26 μm.

When the percentage of silica particles having diameters of 10 μm or less exceeds 3% by mass, pores open on the cell wall surfaces contain more pressure-loss-increasing fine pores. The percentage of silica particles having diameters of 10 μm or less is preferably 2% or less by mass. When the percentage of particles having diameters of 100 μm or more exceeds 3% by mass, there are more coarse pores, resulting in a reduced amount of a catalytic material carried. The percentage of silica particles having diameters of 100 μm or more is preferably 2% or less by mass. The particle diameter distribution deviation SD of silica is preferably 0.35 or less, more preferably 0.3 or less.

The silica particles preferably have sphericity of 0.5 or more. When the sphericity of silica particles is less than 0.5, pores on the cell walls undesirably contain more pores having acute-angle corners, which may act as starting points of breakage, likely providing the honeycomb structure with lower strength. The sphericity of silica particles is preferably 0.6 or more, more preferably 0.7 or more. The sphericity of each silica particle is determined by dividing a projected area of the silica particle by an area of a circle having a diameter equal to the longest straight line passing the center of gravity of the silica particle and connecting two points on the periphery, and can be determined by an image analyzer on an electron photomicrograph.

Though silica particles may be crystalline or amorphous, they are preferably amorphous from the aspect of controlling their particle diameter distribution. Amorphous silica can be obtained by pulverizing an ingot produced by melting high-purity natural silica stone at a high temperature. Though silica particles may contain $Na_2O$, $K_2O$, and CaO as impurities, the total amount of the impurities is preferably 0.1% or less to prevent increase in a thermal expansion coefficient.

High-sphericity silica particles can be obtained by spraying fine particles of high-purity natural silica stone into a high-temperature flame. Spraying into a high-temperature flame simultaneously melts and makes silica particles spherical, forming high-sphericity amorphous silica. Further, the particle sizes of spherical silica particles are preferably adjusted by classification, etc.

(b) Kaolin

As a silica material used for the cordierite-forming material, kaolin powder may be added in addition to the silica powder. The kaolin powder is preferably 1-15% by mass. When more than 15% by mass of kaolin powder is added, it may be difficult to obtain cell walls having such a pore structure that a pore diameter d90 at a cumulative pore volume corresponding to 90% of the total pore volume is 10 μm or more. When the kaolin powder is less than 1% by mass, the resultant cordierite-type ceramic honeycomb structure has a large thermal expansion coefficient. The amount of kaolin powder added is more preferably 4-8% by mass.

When kaolin particles are oriented such that their c-axes are perpendicular to the longitudinal direction of the extrusion-molded honeycomb structure, the c-axes of cordierite crystals are in parallel to the longitudinal direction of the honeycomb structure, providing the honeycomb structure with a small thermal expansion coefficient. The shape of kaolin particles has large influence on the orientation of kaolin particles. The cleavage index of kaolin particles, which is an index indicating the shape of kaolin particles quantitatively, is preferably 0.80 or more, more preferably 0.85 or more. The cleavage index of kaolin particles can be determined by the formula of cleavage index=$I_{(002)}/[I_{(200)}+I_{(020)}+I_{(002)}]$, wherein $I_{(200)}$, $I_{(020)}$ and $I_{(002)}$ respectively represent the X-ray diffraction peak intensities of (200), (020) and (002) planes of the press-molded kaolin particles. The larger the cleavage index, the more the kaolin particles are oriented.

(c) Talc 27-43% by mass of talc having a median diameter D50 of 1-10 μm and a particle diameter distribution deviation SD of 0.6 or less is contained in 100% by mass of the cordierite-forming material. Talc, a compound comprising MgO and $SiO_2$, is reacted with nearby $Al_2O_3$ and melted in the sintering process, thereby forming pores. Accordingly, with small-diameter talc mixed with an $Al_2O_3$ source, large numbers of small-diameter pores are dispersively formed in the cell walls, resulting in improved communicability of pores in the cell walls. Talc having a median pore diameter D50 of less than 1 μm provides low communicability of pores, resulting in low pressure loss characteristics. On the other hand, talc having a median pore diameter D50 of more than 10 μm forms many coarse pores. The median diameter D50 of talc is preferably 2-9 μm, more preferably 3-8 μm. The particle diameter distribution deviation SD of talc particles is preferably 0.55 or less, more preferably 0.5 or less.

To reduce the thermal expansion coefficient of a ceramic honeycomb structure having a cordierite-based crystal phase, talc is preferably in a planar shape. The morphology index, which is a measure of the flatness of talc particles, is preferably 0.50 or more, more preferably 0.60 or more, most preferably 0.70 or more. The morphology index is, as described in U.S. Pat. No. 5,141,686, determined by the formula of morphology index=$Ix/(Ix+2Iy)$, wherein Ix and Iy respectively represent the diffraction intensities of (004) and (020) planes of talc, which are obtained by the X-ray diffraction measurement of planar talc particles. The larger the morphology index, the higher the flatness of talc particles.

Talc may contain as impurities $Fe_2O_3$, CaO, $Na_2O$, $K_2O$, etc. The amount of $Fe_2O_3$ is preferably 0.5-2.5% by mass in the magnesia source to obtain the desired particle size distribution. The total amount of $Na_2O$, $K_2O$ and CaO is preferably 0.50% or less by mass to have a low thermal expansion coefficient.

The amount of talc added to the cordierite-forming material is preferably 27-43% by mass to have cordierite-based crystals. When the pore-forming material used was constituted by hollow resin particles coated with talc as an inorganic powder, the amount of talc added to the cordierite-forming material is properly adjusted, taking into account the amount of talc attached to the pore-forming material.

(d) Alumina 15-30% by mass of alumina is contained in 100% by mass of the cordierite-forming material. The median diameter D50 of alumina is 1-8 μm, and a particle diameter D90 at a cumulative volume corresponding to 90% of the total volume is 5-15 μm, in a curve expressing the relation of a particle diameter to a cumulative volume. The median diameter D50 of alumina is preferably 2-7 μm, more preferably 3-6 μm. Usable alumina materials are preferably alumina and aluminum hydroxide. The total amount of $Na_2O$, $K_2O$ and CaO, impurities, contained in alumina or aluminum hydroxide is preferably 0.5% or less by mass, more preferably 0.3% or less by mass, most preferably 0.1% or less by mass.

(3) Production Method

The cordierite-type ceramic honeycomb structure is produced by dry-mixing a ceramic material, a pore-forming material, a binder, and if necessary, additives such as a dispersant, a surfactant, etc., blending them with water, extruding the resultant plastic moldable material from a known honeycomb-structure-molding die by a known extrusion molding method, to form a honeycomb-structured green body, drying the green body, machining its end and peripheral surfaces, and then sintering it.

The sintering is conducted in a continuous furnace or a batch furnace, with a temperature-elevating speed and a cooling speed adjusted. The green body is kept at 1350-1450° C. for 1-50 hours, and after main cordierite crystals are fully formed, it is cooled to room temperature. Particularly when a large cordierite-type ceramic honeycomb structure having an outer diameter of 150 mm or more and a length of 150 mm or more is produced, the temperature-elevating speed is preferably 0.2-10° C./hour in a binder-decomposing temperature range (for example, 150-350° C.), and 5-20° C./hour in a cordierite-forming temperature range (for example, 1150-1400° C.), to avoid cracking in the green body being sintered. The cooling is preferably conducted at a speed of 20-40° C./hour, particularly in a range of 1400-1300° C.

The resultant ceramic honeycomb structure can be used not only for an SRC catalyst carrier according to the present invention, but also for a ceramic honeycomb filter 20 having end portions 3a, 3b of desired flow paths 3 alternately plugged by a known method as shown in FIG. 6. Plugs may be formed before or after the sintering of a ceramic honeycomb structure.

The present invention will be explained in more detail referring to Examples below, without intention of restricting the present invention thereto.

EXAMPLES 1-10 AND COMPARATIVE EXAMPLES 1-8

Silica powder, talc powder, alumina powder, aluminum hydroxide, kaolin, and a pore-forming material each having a particle shape (particle size, particle diameter distribution, etc.) shown in Tables 1-5 were mixed in amounts shown in Table 7, to obtain each cordierite-forming material powder (including inorganic powder on the pore-forming material) having a chemical composition of 50% by mass of $SiO_2$, 36% by mass of $Al_2O_3$, and 14% by mass of MgO. A pore-forming material having the particle shape shown in Table 6 was added in an amount shown in Table 7 to each cordierite-forming material powder. After adding methylcellulose, the resultant mixture was blended with water to produce each plastic moldable ceramic material comprising a cordierite-forming material. The pore-forming materials A to G and J were talc-coated, hollow resin particles containing a butane gas, the pore-forming material H was silica-coated, hollow resin particles containing a butane gas, and the pore-forming material I was hollow resin particles containing a butane gas. The sphericity of pore-forming material particles was determined by taking an electron photomicrograph of particles, measuring a projected area A1 of each particle and an area A2 of a circle having a diameter equal to the longest straight line passing a center of gravity of the particle and connecting two points on a periphery of the particle on the electron photomicrograph by an image analyzer, calculating A1/A2 for 20 particles, and averaging the calculated values.

TABLE 1

| Silica | Median Diameter D50 (μm) | Percentage (%) 10 μm or less | 100 μm or more | SD[(1)] |
|---|---|---|---|---|
| A | 16.0 | 2.5 | 2.6 | 0.37 |
| B | 18.5 | 2.2 | 1.5 | 0.32 |
| C | 23.4 | 2.0 | 1.1 | 0.34 |
| D | 25.2 | 1.9 | 1.1 | 0.30 |
| E | 25.1 | 1.9 | 1.1 | 0.29 |
| F | 13.0 | 4.5 | 1.2 | 0.44 |
| G | 25.0 | 1.9 | 1.1 | 0.41 |
| H | 40.0 | 2.5 | 8.8 | 0.45 |

Note:
[(1)]SD is a particle diameter distribution deviation.

| Silica | Sphericity | Component (% by mass) CaO | $Na_2O$ | $K_2O$ |
|---|---|---|---|---|
| A | 0.55 | 0.001 | 0.0022 | 0.0025 |
| B | 0.60 | 0.001 | 0.0018 | 0.0023 |
| C | 0.65 | 0.001 | 0.0023 | 0.0026 |
| D | 0.85 | 0.001 | 0.0019 | 0.0025 |
| E | 0.70 | 0.001 | 0.0024 | 0.0018 |
| F | 0.20 | 0.001 | 0.0020 | 0.0024 |
| G | 0.58 | 0.001 | 0.0019 | 0.0023 |
| H | 0.41 | 0.001 | 0.0025 | 0.0022 |

TABLE 2

| Talc | Median Diameter D50 (μm) | SD[(1)] | Morphology Index |
|---|---|---|---|
| A | 5.4 | 0.56 | 0.68 |
| B | 7.1 | 0.51 | 0.86 |
| C | 2.4 | 0.56 | 0.81 |
| D | 2.8 | 0.63 | 0.44 |
| E | 14 | 0.65 | 0.42 |
| F | 13 | 0.66 | 0.40 |

Note:
[(1)]SD is a particle diameter distribution deviation.

| Talc | Component (% by mass) CaO | $Na_2O$ | $K_2O$ | $Fe_2O_3$ |
|---|---|---|---|---|
| A | 0.15 | 0.001 | 0.001 | 1.2 |
| B | 0.11 | 0.001 | 0.001 | 1.0 |
| C | 0.08 | 0.001 | 0.001 | 1.1 |
| D | 0.18 | 0.001 | 0.002 | 1.0 |
| E | 0.12 | 0.001 | 0.001 | 1.1 |
| F | 0.16 | 0.001 | 0.001 | 1.3 |

TABLE 3

| Alumina | Median Diameter D50 (μm) | D90 (μm) | Component (% by mass) CaO | $Na_2O$ | $K_2O$ |
|---|---|---|---|---|---|
| A | 4.5 | 8.6 | 0.001 | 0.15 | 0.001 |
| B | 1.7 | 5.9 | 0.001 | 0.13 | 0.001 |
| C | 8 | 19 | 0.001 | 0.18 | 0.001 |
| D | 11 | 19 | 0.001 | 0.21 | 0.001 |

TABLE 4

| Aluminum Hydroxide | Median Diameter D50 (μm) | Component (% by mass) CaO | $Na_2O$ | $K_2O$ |
|---|---|---|---|---|
| A | 11 | 0.001 | 0.04 | 0.001 |
| B | 9 | 0.001 | 0.05 | 0.001 |
| C | 12 | 0.001 | 0.06 | 0.001 |

TABLE 5

| Kaolin | Median Diameter D50 (μm) | Cleavage Index | CaO | Na$_2$O | K$_2$O |
|---|---|---|---|---|---|
| A | 5.5 | 0.90 | 0.11 | 0.02 | 0.07 |
| B | 5.0 | 0.80 | 0.15 | 0.03 | 0.08 |

Component (% by mass)

TABLE 6

| Pore-Forming Material | Type | Median Diameter D50 (μm) | D10 (μm) | D20 (μm) | D80 (μm) | D90 (μm) | SD[(1)] |
|---|---|---|---|---|---|---|---|
| A | Talc Coated Hollow Resin | 26.1 | 14.6 | 17.1 | 39.0 | 46.8 | 0.36 |
| B | Talc Coated Hollow Resin | 27.8 | 16.4 | 19.6 | 40.4 | 49.2 | 0.31 |
| C | Talc Coated Hollow Resin | 31.2 | 18.1 | 23.4 | 43.0 | 55.4 | 0.26 |
| D | Talc Coated Hollow Resin | 20.0 | 11.5 | 12.7 | 35.6 | 43.0 | 0.45 |
| E | Talc Coated Hollow Resin | 36.0 | 25.5 | 27.5 | 71.6 | 86.0 | 0.42 |
| F | Talc Coated Hollow Resin | 20.0 | 14.0 | 16.0 | 40.0 | 49.0 | 0.40 |
| G | Talc Coated Hollow Resin | 26.8 | 11.0 | 16.5 | 51.2 | 68.0 | 0.49 |
| H | Silica-Coated Hollow Resin | 26.8 | 15.0 | 18.0 | 40.6 | 47.1 | 0.35 |
| I | Hollow Resin | 43 | 25 | 24.0 | 67.5 | 67 | 0.45 |
| J | Talc Coated Hollow Resin | 30.1 | 17.9 | 22.5 | 41.0 | 55.1 | 0.26 |

Note:
[(1)]SD is a particle diameter distribution deviation.

| Pore-Forming Material | Sphericity | True Density | Maximum Compression Recovery Lmax (mm) | L/Lmax[(1)] (%) |
|---|---|---|---|---|
| A | 0.90 | 0.23 | 3.8 | 83 |
| B | 0.91 | 0.23 | 4.1 | 86 |
| C | 0.92 | 0.23 | 4.3 | 91 |
| D | 0.90 | 0.22 | 1.6 | 46 |
| E | 0.88 | 0.24 | 1.9 | 67 |
| F | 0.93 | 0.22 | 3.2 | 72 |
| G | 0.89 | 0.23 | 2.3 | 58 |
| H | 0.90 | 0.23 | 3.9 | 82 |
| I | 0.92 | 0.02 | 2.4 | 75 |
| J | 0.92 | 0.23 | 1.9 | 61 |

Note:
[(1)]A ratio of the compression recovery L to the maximum compression recovery Lmax.

Inorganic Powder on Pore-Forming Material

| Pore-Forming Material | Type | Coating Amount (% by mass) | Median Diameter D50 (μm) | CaO | Na$_2$O | K$_2$O |
|---|---|---|---|---|---|---|
| A | Talc | 72 | 1.5 | 0.12 | 0.001 | 0.001 |
| B | Talc | 77 | 1.7 | 0.14 | 0.001 | 0.001 |
| C | Talc | 80 | 2.0 | 0.08 | 0.001 | 0.001 |
| D | Talc | 75 | 1.2 | 0.07 | 0.001 | 0.001 |
| E | Talc | 86 | 2.5 | 0.15 | 0.001 | 0.001 |
| F | Talc | 81 | 1.3 | 0.12 | 0.001 | 0.001 |
| G | Talc | 75 | 1.6 | 0.10 | 0.001 | 0.001 |
| H | Silica | 70 | 1.5 | 0.001 | 0.001 | 0.001 |
| I | No | — | — | — | — | — |
| J | Talc | 83 | 2.0 | 0.08 | 0.001 | 0.001 |

Component ((% by mass)

The particle sizes and particle diameter distributions of the silica powder, the talc powder, the alumina powder, the aluminum hydroxide powder, the kaolin powder and the pore-forming material were measured by a particle diameter distribution meter (Microtrack MT3000 available from Nikkiso Co., Ltd.), and their median diameters D50, the percentages of particle diameters of 10 μm or less, the percentages of particle diameters of 100 μm or more, D90, and D10 were determined from the particle diameter distributions.

TABLE 7

| No. | Silica Type | Silica Parts by Mass | Talc Type | Talc Parts by Mass | Alumina Type | Alumina Parts by Mass |
|---|---|---|---|---|---|---|
| Example 1 | A | 18.0 | A | 33.8 | A | 20.0 |
| Example 2 | B | 18.0 | B | 32.1 | A | 20.0 |
| Example 3 | C | 18.0 | B | 31.0 | A | 20.0 |
| Example 4 | D | 18.0 | B | 30.7 | A | 20.0 |
| Example 5 | E | 18.0 | B | 30.9 | A | 20.0 |
| Example 6 | E | 18.0 | B | 30.7 | A | 20.0 |
| Example 7 | A | 18.0 | C | 33.0 | B | 20.0 |
| Example 8 | A | 10.9 | C | 41.5 | B | 23.0 |
| Example 9 | F | 18.0 | B | 29.0 | A | 20.0 |
| Example 10 | D | 18.0 | B | 30.4 | A | 20.0 |
| Com. Ex. 1 | F | 18.0 | D | 35.2 | A | 20.0 |
| Com. Ex. 2 | A | 18.0 | A | 35.2 | A | 20.0 |
| Com. Ex. 3 | E | 18.0 | B | 24.6 | A | 20.0 |
| Com. Ex. 4 | G | 17.9 | E | 41.1 | C | 23.3 |
| Com. Ex. 5 | G | 17.9 | E | 41.1 | C | 23.3 |
| Com. Ex. 6 | A | 18.0 | A | 33.6 | A | 20.0 |
| Com. Ex. 7 | A | 18.0 | A | 34.1 | A | 20.0 |
| Com. Ex. 8 | C | 18.0 | B | 31.0 | A | 20.0 |

| No. | Aluminum Hydroxide Type | Aluminum Hydroxide Amount (%) | Kaolin Type | Kaolin Amount (%) | Pore-Forming Material Type | Pore-Forming Material Amount (%) |
|---|---|---|---|---|---|---|
| Example 1 | A | 15 | A | 6.2 | A | 9.3 |
| Example 2 | A | 15 | A | 6.2 | B | 10.9 |
| Example 3 | A | 15 | A | 6.2 | C | 11.8 |
| Example 4 | A | 15 | A | 6.2 | C | 12.2 |
| Example 5 | A | 15 | A | 6.2 | C | 12.0 |
| Example 6 | A | 15 | A | 6.2 | B | 14.5 |
| Example 7 | B | 15 | B | 6.2 | A | 10.3 |
| Example 8 | B | 11 | B | 6.0 | H | 10.3 |
| Example 9 | A | 15 | A | 6.2 | B | 14.5 |
| Example 10 | A | 15 | B | 6.0 | B | 13.2 |
| Com. Ex. 1 | A | 15 | A | 6.2 | D | 7.1 |
| Com. Ex. 2 | A | 15 | A | 6.2 | D | 7.1 |
| Com. Ex. 3 | A | 15 | A | 6.2 | E | 18.5 |
| Com. Ex. 4 | C | 11.1 | A | 6.3 | F | 7 |
| Com. Ex. 5 | C | 11.1 | A | 6.3 | I | 12.5 |
| Com. Ex. 6 | A | 15.0 | A | 6.2 | F | 8.2 |
| Com. Ex. 7 | A | 15.0 | A | 6.2 | G | 8.5 |
| Com. Ex. 8 | A | 15 | A | 6.2 | J | 11.8 |

Each moldable material was extruded to form a honeycomb-structured green body, which was dried, machined to remove its peripheral portion, and then sintered according to a 209-hour schedule comprising temperature elevation at an average speed of 10° C./hour between room temperature and 150° C., 2° C./hour between 150° C. and 350° C., 20° C./hour between 350° C. and 1150° C., and 15° C./hour between 1150° C. and 1410° C., keeping the highest temperature of 1410° C. for 24 hours, and cooling at an average speed of 30° C./hour between 1400° C. and 1300° C., and 80° C./hour between 1300° C. and 100° C., in a sintering furnace. The sintered ceramic honeycomb body was coated with a skin material comprising amorphous silica and colloidal silica on the outer peripheral surface, and dried to provide a cordierite-type ceramic honeycomb structure having an outer diameter of 266.7 mm, a length of 304.8 mm, and the cell wall thickness and cell density shown in Table 8. In each of Examples 1-10 and Comparative Examples 1-8, two cordierite-type ceramic honeycomb structures were produced.

With respect to one of the cordierite-type ceramic honeycomb structures in each of Examples 1-10 and Comparative Examples 1-8, the pore diameter distribution was measured by the following mercury porosimetry, pores open on the cell wall surfaces were image-analyzed, and the A-axis compression strength and thermal expansion coefficient were measured. Their results as shown in Table 8.

(a) Measurement by Mercury Porosimetry

According to mercury porosimetry, a test piece (10 mm×10 mm×10 mm) cut out of each cordierite-type ceramic honeycomb structure was set in a measurement cell of Autopore III available from Micromeritics, the cell was evacuated, and mercury was then introduced into the cell under pressure to determine the relation between the pressure and the volume of mercury intruded into pores in the test piece, from which the relation between a pore diameter and a cumulative pore volume was determined. The mercury-intruding pressure was 0.5 psi ($0.35 \times 10^{-3}$ kg/mm$^2$), and constants used for calculating the pore diameter from the pressure were a contact angle of 130°, and a surface tension of 484 dyne/cm.

Calculated from the mercury porosimetry measurement results were a total pore volume, porosity, a pore diameter d10 at a cumulative pore volume corresponding to 10% of the total pore volume, a pore diameter d20 at 20%, a pore diameter (median pore diameter) d50 at 50%, a pore diameter d80 at 80%, a pore diameter d90 at 90%, (d10−d90)/d50, σ=log(d20)−log(d80), wherein σ is the difference between the logarithm of the pore diameter d20 at a cumulative pore volume corresponding to 20% of the total pore volume and the logarithm of the pore diameter d80 at 80%, and the maximum of the inclination $S_n$ of a curve of a cumulative pore volume to a pore diameter (logarithm). The porosity was calculated from the measured total pore volume, using 2.52 g/cm$^3$ as the true density of cordierite.

The inclination $S_n$ of the cumulative pore volume curve was determined from a curve of a cumulative pore volume to a pore diameter. The inclination $S_n$ of the cumulative pore volume curve at an n-th measurement point can be determined from a pore diameter $D_{n-1}$ (μm) and a cumulative pore volume $V_{n-1}$ (cm$^3$/g) at a (n−1)-th measurement point from the start of measurement, and a pore diameter $D_n$ (μm) and a cumulative pore volume $V_n$ (cm$^3$/g) at an n-th measurement point, by the formula of $S_n=-(V_n-V_{n-1})/[\log(D_n)-\log(D_{n-1})]$. The maximum of $S_n$ was selected from the measured values of $S_n$.

(b) Image Analysis of Pores Open on Cell Wall Surfaces

The opening area ratio and median opening diameter of pores open on the cell wall surfaces were determined on an electron photomicrograph of a surface of a cell wall piece cut out of the cordierite-type ceramic honeycomb structure. The opening area ratio, a percentage (%) of the total opening area of pores per a measured field area, was determined by treating and analyzing the electron photomicrograph by an image analyzer (Image-Pro Plus ver. 6.3 available from Media Cybernetics) under the filtering conditions of intensifying filter: LoPass (lowpass filter), option: 3×3, the number of passes: 2, and intensity: 8. The median opening diameter was obtained by determining the area S of each pore open on the cell wall surface by image analysis, calculating an equivalent circle diameter of each pore from the area S by the formula of $2\times(S/\pi)^{1/2}$, plotting the cumulative area of pores open on the cell wall surface (cumulative opening area of pores having diameters equal to or smaller than a particular equivalent circle diameter) against the equivalent circle diameter on a graph, and determining an equivalent circle diameter of a pore at a cumulative area corresponding to 50% of the total pore area on the graph.

(c) Thermal Expansion Coefficient

A test piece having a cross section shape of 4.5 mm×4.5 mm and a length of 50 mm was cut out of the honeycomb structure with its longitudinal direction substantially in alignment with the flow path direction, and heated from room temperature to 800° C. at a temperature-elevating speed of 10° C./minute to measure longitudinal length increase under a constant load of 20 g by a thermomechanical analyzer (TMA, compression load type/differential expansion type, ThermoPlus available from Rigaku Corp.), to determine an average thermal expansion coefficient between 40° C. and 800° C.

(d) A-Axis Compression Strength

The A-axis compression strength was measured according to M505-87, "Test Method of Monolithic Ceramic Carrier for Automobile Exhaust Gas Cleaning Catalyst" of the Society of Automotive Engineers of Japan.

TABLE 8

| No. | Total Pore Volume (cm$^3$/g) | Porosity (%) | d10 (μm) | d20 (μm) | d50 (μm) | d80 (μm) | d90 (μm) |
|---|---|---|---|---|---|---|---|
| Example 1 | 0.742 | 65.2 | 49.4 | 27.1 | 18.6 | 15.8 | 10.6 |
| Example 2 | 0.829 | 67.6 | 46.8 | 25.5 | 19.1 | 16.2 | 12.8 |
| Example 3 | 0.881 | 68.9 | 46.1 | 25.1 | 20.6 | 17.7 | 14.4 |
| Example 4 | 0.995 | 71.5 | 36.1 | 29.6 | 22.8 | 19.8 | 16.5 |
| Example 5 | 0.959 | 70.7 | 39.2 | 28.2 | 21.1 | 18.6 | 15.8 |
| Example 6 | 1.163 | 74.6 | 49.0 | 26.8 | 19.5 | 15.2 | 11.1 |
| Example 7 | 0.754 | 65.5 | 48.8 | 26.1 | 18.1 | 15.4 | 10.2 |
| Example 8 | 0.769 | 66.0 | 47.7 | 26.7 | 18.8 | 15.9 | 10.5 |
| Example 9 | 0.745 | 65.2 | 48.2 | 26.4 | 18.0 | 15.2 | 10.1 |
| Example 10 | 0.969 | 70.9 | 47.3 | 33.3 | 26.5 | 21.8 | 20.7 |
| Com. Ex. 1 | 0.588 | 59.7 | 51.1 | 32.1 | 15.6 | 9.5 | 7.8 |
| Com. Ex. 2 | 0.614 | 60.7 | 52.3 | 23.2 | 17.1 | 13.4 | 8.2 |
| Com. Ex. 3 | 1.442 | 78.4 | 69.4 | 45.3 | 29.5 | 19.0 | 11.3 |
| Com. Ex. 4 | 0.65 | 62.1 | 32.1 | 24.6 | 17.5 | 11.7 | 7.0 |
| Com. Ex. 5 | 1.058 | 72.7 | 61.2 | 42.0 | 26.6 | 16.4 | 10.7 |
| Com. Ex. 6 | 0.739 | 65.1 | 48.1 | 27.5 | 17.5 | 15.0 | 10.8 |
| Com. Ex. 7 | 0.778 | 66.2 | 55.0 | 32.0 | 19.8 | 15.0 | 11.0 |
| Com. Ex. 8 | 0.721 | 64.5 | 42.8 | 23.0 | 16.6 | 13.2 | 10.3 |

| No. | (d10 − d90)/d50 | σ | Maximum of $S_n$ |
|---|---|---|---|
| Example 1 | 2.1 | 0.23 | 3.1 |
| Example 2 | 1.8 | 0.20 | 3.5 |
| Example 3 | 1.5 | 0.15 | 4.0 |
| Example 4 | 0.9 | 0.17 | 4.9 |
| Example 5 | 1.1 | 0.18 | 5.3 |
| Example 6 | 1.9 | 0.25 | 3.2 |
| Example 7 | 2.1 | 0.23 | 3.2 |
| Example 8 | 2.0 | 0.23 | 3.2 |
| Example 9 | 2.1 | 0.24 | 3.0 |
| Example 10 | 1.0 | 0.18 | 3.4 |
| Com. Ex. 1 | 2.8 | 0.53 | 0.82 |
| Com. Ex. 2 | 2.6 | 0.24 | 1.7 |
| Com. Ex. 3 | 2.0 | 0.38 | 2.3 |
| Com. Ex. 4 | 1.4 | 0.32 | 1.3 |

TABLE 8-continued

| No. | | | |
|---|---|---|---|
| Com. Ex. 5 | 1.9 | 0.41 | 1.6 |
| Com. Ex. 6 | 2.1 | 0.26 | 3.3 |
| Com. Ex. 7 | 2.2 | 0.33 | 1.9 |
| Com. Ex. 8 | 2.0 | 0.24 | 2.2 |

| No. | Surface Opening Area Ratio (%) | Median Surface Opening Diameter (μm) | Cell Wall Thickness (mil, mm) | Cell Density (cpsi, cells/cm$^2$) |
|---|---|---|---|---|
| Example 1 | 26.1 | 25.5 | 11 (0.28) | 255 (39.5) |
| Example 2 | 27.4 | 29.6 | 11 (0.28) | 255 (39.5) |
| Example 3 | 28.6 | 29.4 | 11 (0.28) | 255 (39.5) |
| Example 4 | 33.2 | 41.3 | 10 (0.25) | 260 (40.3) |
| Example 5 | 46.2 | 45.1 | 10 (0.25) | 260 (40.3) |
| Example 6 | 28.1 | 29.1 | 10 (0.25) | 260 (40.3) |
| Example 7 | 23.2 | 21.5 | 9 (0.23) | 280 (43.4) |
| Example 8 | 24.4 | 23.1 | 9 (0.23) | 280 (43.4) |
| Example 9 | 24.0 | 22.2 | 9 (0.23) | 280 (43.4) |
| Example 10 | 28.9 | 31.9 | 10 (0.25) | 260 (40.3) |
| Com. Ex. 1 | 20.1 | 22.4 | 11 (0.28) | 255 (39.5) |
| Com. Ex. 2 | 23.6 | 24.9 | 11 (0.28) | 255 (39.5) |
| Com. Ex. 3 | 56.4 | 59.1 | 10 (0.25) | 260 (40.3) |
| Com. Ex. 4 | 23 | 24.1 | 10 (0.25) | 260 (40.3) |
| Com. Ex. 5 | 26.8 | 26.1 | 10 (0.25) | 260 (40.3) |
| Com. Ex. 6 | 26.6 | 26.0 | 11 (0.28) | 255 (39.5) |
| Com. Ex. 7 | 27.0 | 26.9 | 11 (0.28) | 255 (39.5) |
| Com. Ex. 8 | 23.2 | 26.3 | 11 (0.28) | 255 (39.5) |

| No. | Thermal Expansion Coefficient (× 10$^{-7}$/° C.) | A-Axis Strength (MPa) |
|---|---|---|
| Example 1 | 10 | 2.4 |
| Example 2 | 10 | 2.3 |
| Example 3 | 11 | 2.1 |
| Example 4 | 10 | 1.8 |
| Example 5 | 11 | 1.9 |
| Example 6 | 9 | 1.5 |
| Example 7 | 10 | 2.2 |
| Example 8 | 10 | 2.0 |
| Example 9 | 10 | 2.0 |
| Example 10 | 10 | 1.6 |
| Com. Ex. 1 | 11 | 3.1 |
| Com. Ex. 2 | 11 | 2.8 |
| Com. Ex. 3 | 10 | 0.9 |
| Com. Ex. 4 | 10 | 2.4 |
| Com. Ex. 5 | 11 | 1.9 |
| Com. Ex. 6 | 15 | 0.5 |
| Com. Ex. 7 | 10 | 2.3 |
| Com. Ex. 8 | 11 | 2.4 |

An SCR catalyst was produced by carrying a platinum catalyst as an active metal on another one of the cordierite-type ceramic honeycomb structures in each of Examples 1-10 and Comparative Examples 1-8, to measure the amount of a catalyst carried per a unit volume, initial pressure loss, and a NOx-removing ratio. The results are shown in Table 9.

(c) Amount of Catalyst Carried Per Unit Volume

The amount of a catalyst carried per a unit volume was determined by dividing the mass difference between before and after carrying the platinum catalyst by the volume (L) of the carrier.

(d) Initial Pressure Loss

The initial pressure loss was measured on a cordierite-type ceramic honeycomb filter fixed to a pressure loss test stand, to which air was supplied at a flow rate of 10 Nm$^3$/min, and expressed by pressure difference between the inlet side and the outlet side (pressure loss). The initial pressure loss was evaluated by the following standards:

Poor: The pressure loss was more than 1.0 kPa,
Fair: It was more than 0.8 kPa and 1.0 kPa or less,
Good: It was more than 0.6 kPa and 0.8 kPa or less, and
Excellent: It was 0.6 kPa or less.

(e) NOx-Removing Ratio

Platinum as an active metal was carried on a cordierite-type ceramic honeycomb structure to produce an SCR catalyst, into which an exhaust gas containing 400 ppm of NOx at 300° C. was introduced to measure the amount of NOx in the exhaust gas at the exit, with urea added in the same amount (calculated as N) as that of NOx in the exhaust gas, thereby determining a NOx-removing ratio. The NOx-removing ratio was evaluated by the following standard.

| Excellent | The NOx-removing ratio was 90% or more, |
|---|---|
| Good | It was 80% or more and less than 90%, |
| Fair | It was 70% or more and less than 80%, and |
| Poor | It was less than 70%. |

TABLE 9

| No. | Amount of Catalyst[1] (g/L) | Initial Pressure Loss | NOx-Removing Ratio |
|---|---|---|---|
| Example 1 | 232 | Fair | Good |
| Example 2 | 212 | Good | Good |
| Example 3 | 277 | Good | Excellent |
| Example 4 | 292 | Excellent | Excellent |
| Example 5 | 285 | Excellent | Excellent |
| Example 6 | 195 | Good | Fair |
| Example 7 | 173 | Fair | Fair |
| Example 8 | 187 | Fair | Fair |
| Example 9 | 182 | Fair | Fair |
| Example 10 | 204 | Good | Good |
| Com. Ex. 1 | 117 | Poor | Poor |
| Com. Ex. 2 | 155 | Poor | Fair |
| Com. Ex. 3 | 145 | Good | Poor |
| Com. Ex. 4 | 160 | Good | Poor |
| Com. Ex. 5 | 149 | Good | Poor |
| Com. Ex. 6 | 188 | Poor | Fair |
| Com. Ex. 7 | 142 | Good | Poor |
| Com. Ex. 8 | 189 | Poor | Fair |

Note:
[1]The amount of a catalyst carried per a unit volume.

It is clear from Table 9 that the cordierite-type ceramic honeycomb structures of Examples 1-10 within the present invention had low initial pressure loss and excellent NOx-removing ratios.

Because the cordierite-type ceramic honeycomb structure of Comparative Example 1 contained only 7.1 parts by mass of the pore-forming material D having a median diameter of 20 μm (less than 25 μm), and silica having relatively small diameters, it suffered poor pressure loss characteristics due to a small median diameter of pores, and a low NOx-removing ratio due to a small amount of the catalyst carried.

Because the cordierite-type ceramic honeycomb structure of Comparative Example 2 contained only 7.1 parts by mass of the pore-forming material D having a median diameter of 20 μm (less than 25 μm), despite silica, talc and alumina meeting the requirements of the present invention, it suffered poor pressure loss characteristics due to a small median diameter of pores.

Though the cordierite-type ceramic honeycomb structure of Comparative Example 3 contained a large amount (18.5 parts by mass) of the pore-forming material E having a median diameter of 36 μm (more than 35 μm) had good pressure loss characteristics due to a large median diameter and broad diameter distribution of pores, it suffered a low NOx-removing ratio because of a small amount of the catalyst carried.

In the cordierite-type ceramic honeycomb structure of Comparative Example 4, the pore-forming material was not coated with inorganic powder, and only 7 parts by mass of hollow resin particles having a relatively large median diameter was used. Accordingly, it suffered poor pressure loss characteristics because of a small median diameter of pores, despite silica, talc and alumina meeting the requirements of the present invention.

In the cordierite-type ceramic honeycomb structure of Comparative Example 5, the pore-forming material was not coated with inorganic powder, and 12.5 parts by mass of hollow resin particles having a relatively large median diameter were used. Accordingly, it suffered a low NOx-removing ratio because of a small amount of the catalyst carried, though it had good pressure loss characteristics because of a large median diameter of pores, and though silica, talc and alumina met the requirements of the present invention.

Because the cordierite-type ceramic honeycomb structure of Comparative Example 6 contained a pore-forming material having a relatively small median diameter, it suffered poor pressure loss characteristics due to a small median diameter of pores.

Because the cordierite-type ceramic honeycomb structure of Comparative Example 7 contained a pore-forming material having a broad particle diameter distribution, it suffered a low NOx-removing ratio due to a small amount of the catalyst carried, though it had good pressure loss characteristics due to a broad pore diameter distribution with a large amount of large pores.

Because the cordierite-type ceramic honeycomb structure of Comparative Example 8 contained a pore-forming material having a low maximum compression recoverability, it suffered poor pressure loss characteristics due to a small median diameter of pores.

Effect of the Invention

In an SCR catalyst comprising the cordierite-type ceramic honeycomb structure of the present invention as a carrier, nitrogen oxide in a flowing exhaust gas is reacted with a large amount of a catalytic material carried not only on cell wall surfaces but also in pores open on the cell wall surfaces, resulting in a larger nitrogen-oxide-removing effect than when conventional honeycomb structures are used. Also, because a relatively large amount of a catalytic material is carried on the cell wall surfaces and in pores open thereon in the cordierite-type ceramic honeycomb structure of the present invention, exhaust-gas-flowing paths are unlikely narrowed or clogged by the catalytic material, thereby avoiding the carried catalytic material from hindering the exhaust gas flow, and thus preventing pressure loss increase.

What is claimed is:

1. A ceramic honeycomb structure having a plurality of flow paths partitioned by porous cell walls comprising cordierite,
    (a) said cell walls having porosity of more than 65% and 75% or less; and
    (b) in a pore diameter distribution measured by mercury porosimetry,
    (i) a pore diameter d10 at a cumulative pore volume (cumulative volume of pores in a range from the maximum pore diameter to a particular pore diameter) corresponding to 10% of the total pore volume being less than 50 µm,
    a pore diameter (median pore diameter) d50 at 50% being 18 µm or more and 27 µm or less,
    a pore diameter d90 at 90% being 10 µm or more, and
    (d10−d90)/d50 being 2.3 or less;
    (ii) σ[=log(d20) −log(d80)] being 0.25 or less, wherein σ represents the difference between a logarithm of a pore diameter d20 at a cumulative pore volume corresponding to 20% of the total pore volume and a logarithm of a pore diameter d80 at a cumulative pore volume corresponding to 80% of the total pore volume; and
    (iii) the maximum of the inclination $S_n = -(V_n - V_{n-1})/[\log(d_n) - \log(d_{n-1})]$ of a curve of a cumulative pore volume to a pore diameter being 3 or more, wherein $d_n$ and $V_n$ are respectively a pore diameter and a cumulative pore volume at an n-th measurement point, and $d_{n-1}$ and $V_{n-1}$ are respectively a pore diameter and a cumulative pore volume at a (n−1)-th measurement point.

2. The ceramic honeycomb structure according to claim 1, wherein pores open on the cell wall surfaces have (i) an opening area ratio of 25-50%, and (ii) an area-based median opening diameter (expressed by equivalent circle diameter) of 25-50 µm.

3. The ceramic honeycomb structure according to claim 1, wherein the maximum of said $S_n$ is 3.5 or more.

4. The ceramic honeycomb structure according to claim 1, wherein the maximum of said $S_n$ is 4.0 or more.

* * * * *